(12) United States Patent
Gugger

(10) Patent No.: US 8,196,685 B2
(45) Date of Patent: Jun. 12, 2012

(54) OUTBOARD ELECTRIC DRIVE FOR VEHICLES

(76) Inventor: David Gugger, Auburn, NH (US)

( * ) Notice: Subject to any disclaimer, the term of this patent is extended or adjusted under 35 U.S.C. 154(b) by 0 days.

(21) Appl. No.: 13/119,730

(22) PCT Filed: Oct. 21, 2009

(86) PCT No.: PCT/US2009/061559
§ 371 (c)(1),
(2), (4) Date: Mar. 18, 2011

(87) PCT Pub. No.: WO2010/048344
PCT Pub. Date: Apr. 29, 2010

(65) Prior Publication Data
US 2011/0186364 A1    Aug. 4, 2011

Related U.S. Application Data

(60) Provisional application No. 61/107,216, filed on Oct. 21, 2008.

(51) Int. Cl.
*B60B 39/00* (2006.01)
(52) U.S. Cl. ........................ 180/15; 180/65.21
(58) Field of Classification Search ............ 180/11, 180/13, 15, 202, 14.2, 14.6, 16, 69.6, 65.21, 180/65.22, 65.285, 65.26; 903/906, 951, 903/952
See application file for complete search history.

(56) References Cited

U.S. PATENT DOCUMENTS

| 2,540,683 | A | * | 2/1951 | MacLean | 200/60 |
| 5,141,067 | A | * | 8/1992 | Diggs | 180/11 |
| 5,350,029 | A | * | 9/1994 | Figueroa | 180/11 |
| 6,904,987 | B2 | | 6/2005 | Haas et al. | |
| 7,147,070 | B2 | | 12/2006 | Leclerc | |
| 7,303,201 | B2 | | 12/2007 | Yakimishyn | |
| 7,451,841 | B2 | * | 11/2008 | Nelson | 180/13 |
| 2005/0225274 | A1 | * | 10/2005 | Carson et al. | 318/432 |
| 2006/0225931 | A1 | | 10/2006 | Kurata | |
| 2009/0048747 | A1 | * | 2/2009 | Stridsberg | 701/55 |
| 2009/0127008 | A1 | * | 5/2009 | Batdorf | 180/11 |
| 2009/0229895 | A1 | * | 9/2009 | Gibbs | 180/11 |
| 2010/0270092 | A1 | * | 10/2010 | Hanslow | 180/11 |

FOREIGN PATENT DOCUMENTS

WO    WO/02/087914    11/2002

* cited by examiner

*Primary Examiner* — Tashiana Adams
(74) *Attorney, Agent, or Firm* — Mesmer & Deleault, PLLC

(57) ABSTRACT

An outboard electric drive attachable to a vehicle having a hitch attachable to a passenger vehicle; a momentum switch capable of detecting acceleration and deceleration; a swing arm; an electric motor; a wheel secured to the swing arm and coupled to the electric motor; an electric storage battery; and a motor controller electrically cabled to the electric motor, storage battery, and momentum switch such that the outboard electric drive applies force in the direction of vehicle travel when the momentum switch senses acceleration and applies force in the direction opposite the direction of vehicle travel when the momentum switch senses deceleration and recharges the battery. The drive can be operated in manual mode using a switch to enable the application constant force. A swing arm raising and lowering system can be provided to raise the apparatus when not in use or when the vehicle is operating in reverse.

15 Claims, 4 Drawing Sheets

OUTBOARD ELECTRIC DRIVE FOR VEHICLES

BACKGROUND OF THE INVENTION

1. Field of the Invention

The present invention relates generally to auxiliary propulsion of passenger vehicles.

2. Description of the Prior Art

The vast majority of vehicles on the road today are powered by gasoline or diesel fuel. The price of fuel has been increasing sharply. Therefore, there is a strong desire to make vehicles as fuel efficient as possible.

In the past several years, this desire has been partially met by providing hybrid vehicles to the market. Hybrid vehicles run partly on electricity stored in batteries and partly on a traditional gasoline engine. Although these hybrid vehicles enjoy greatly improved fuel mileage and are very popular, the great majority of vehicles on the road are non-hybrids. Their owners want to continue to use them for the duration of their service lives, but at the same time want to increase their fuel economy like a hybrid.

What is needed, therefore, is an apparatus that can be used with a traditional gasoline or diesel fuel vehicle to increase fuel economy by making the vehicle into a hybrid.

SUMMARY OF THE INVENTION

The invention is an apparatus that satisfies the need to provide hybrid vehicle fuel economy to a traditional gasoline or diesel fuel vehicle. The apparatus is an outboard electric drive attachable to a vehicle comprising a hitch attachable to a passenger vehicle; a momentum switch capable of detecting acceleration and deceleration; a swing arm; an electric motor; a wheel rotatably secured to the swing arm and operatively coupled to the electric motor; an electric storage battery; and a controller electrically coupled by electric cables to the electric motor, storage battery, and momentum switch such that the outboard electric drive applies force in the direction of vehicle travel when the momentum switch senses acceleration and applies force in the direction opposite the direction of vehicle travel when the momentum switch senses deceleration and charges the battery. A manual switch enabling the operator of the vehicle to request the device to accelerate or decelerate, thereby overriding the momentum switch, can also be provided. The swing arm pivots on a horizontal plane. Also, a means for manually and/or automatically raising and lowering the device to the ground, as well as tucking the device close to the vehicle when raised off the ground, is also provided. These and other features, aspects, and advantages of the present invention will become better understood with regard to the following description, claims, and accompanying drawings.

TABLE OF REFERENCES

Figure 1:
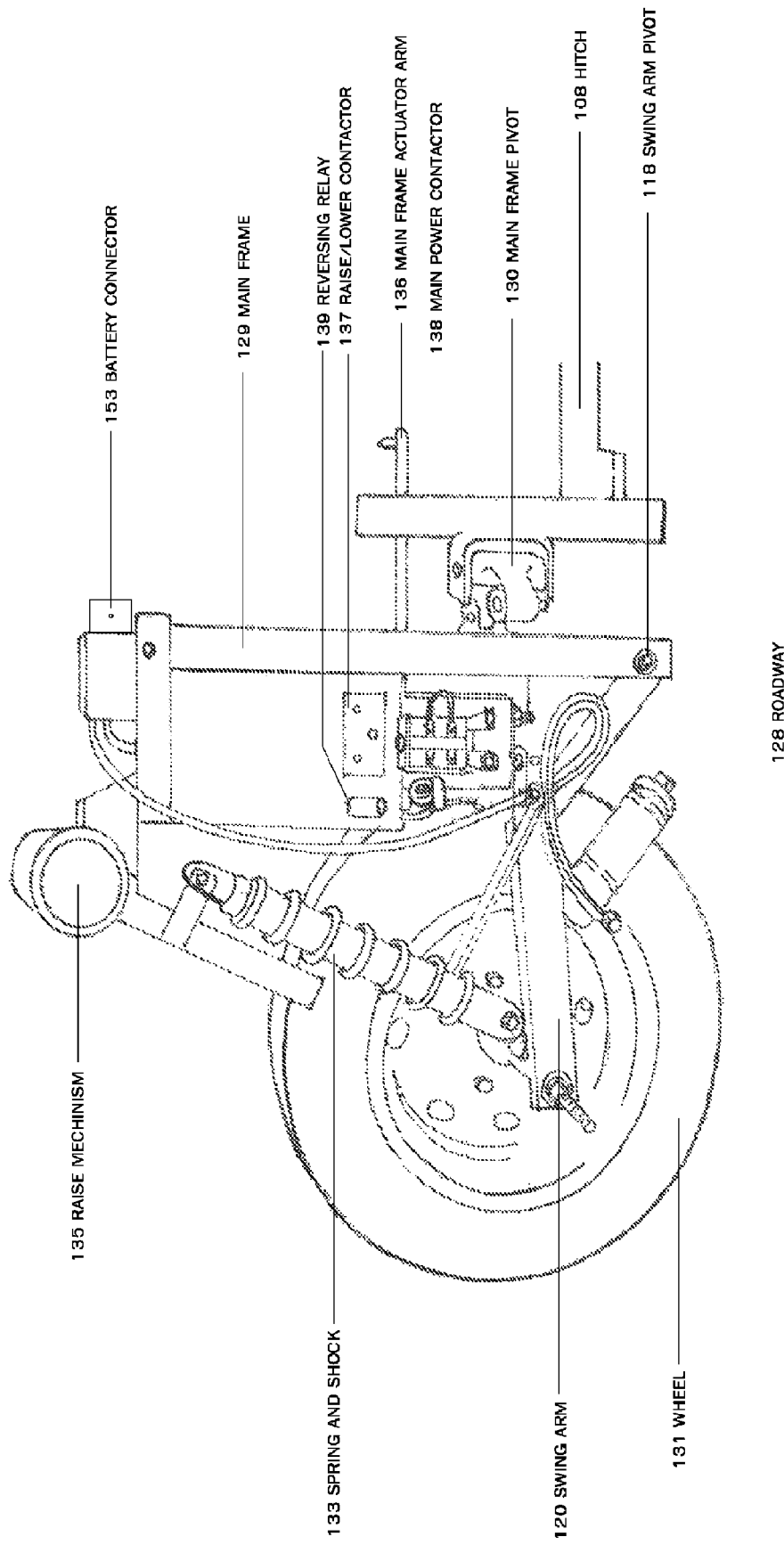
FIG. 1 is a left side elevation of the present invention attached to the rear of a vehicle.

108 Hitch
110 Motor controller
114 Motor cables
118 Swing arm pivot
120 Swing arm
122 Motor
128 Roadway
129 Main frame
130 Main frame pivot
131 Wheel
132 Gear box
133 Spring and shock
134 Vehicle bumper
135 Raise mechanism
136 Main frame actuator arm
137 Raise/lower contactor
138 Main power contactor
139 Reversing relay
140 Manual/automatic switch
141 Information gauge mode switch
142 Information gauge
143 Speed control potentiometer
144 On/off and raise/lower switch
145 Forward/reverse switch
146 Adjustment spring
147 Reverse switch
148 Momentum tube
149 Momentum weight
150 Forward switch
151 Position encoder
152 Motor temperature sensor
153 Battery connector
154 Remote control assembly

DETAILED DESCRIPTION OF THE PREFERRED EMBODIMENT

The invention is an outboard electric drive attachable to a vehicle comprising a hitch attachable to a vehicle; a swing arm pivotally connected to the hitch; a wheel rotatably secured to the swing arm; an electric motor operatively connected to the wheel; a momentum switch capable of detecting acceleration and deceleration operatively coupled to the electric motor; an electric storage battery operatively connected to the electric motor and momentum switch; and a motor controller electrically connected to the electric motor, electric storage battery, and momentum switch such that the wheel applies force in the direction of vehicle travel when the momentum switch senses acceleration and applies force in the direction opposite the direction of vehicle travel when the momentum switch senses deceleration and recharges the battery.

FIG. 1 is a left side elevation of the present invention attached to the rear of a vehicle. Turning to FIG. 1, a hitch 108 is provided that can be attached to the rear of a vehicle. The hitch 108 is secured by a main frame pivot 130 to a main frame 129 to which several electrical and mechanical components are secured. It can be appreciated that other hitching means can be used, including but not limited to a permanently secured attachment, hinges, and pivots.

The main frame 129 is allowed to pivot horizontally in relation to the hitch 108. A swing arm 120 is pivotally secured to the main frame 129 at a swing arm pivot 118 so that the swing arm 120 can pivot vertically in relation to the main frame 129.

A wheel 131 is rotatably secured to the swing arm 120. The wheel 131 makes contact with the roadway 128 for propulsion. A raise mechanism 135 is secured to the main frame 129. A spring and shock assembly 133 is provided having a first end secured to the raise mechanism 135 and a second end opposite the first end secured to the swing arm 120. The spring is biased to extend the swing arm 120 toward a roadway 128. In one embodiment, the wheel 131, swing arm 120, and spring and shock assembly 133 can be provided as a unit from a recycled motorcycle. Assemblies from a Honda® 500 cc motorcycle have worked with this invention. In this way, a substantial portion of the invention could be provided using an inexpensive and otherwise inoperative motorcycle frame.

Other electrical components in this view in FIG. 1 are discussed more fully in other views. They include the reversing relay 139, raise/lower contactor 137, main frame actuator arm 136, main power contactor 138, and battery connector 153.

Figure 2:
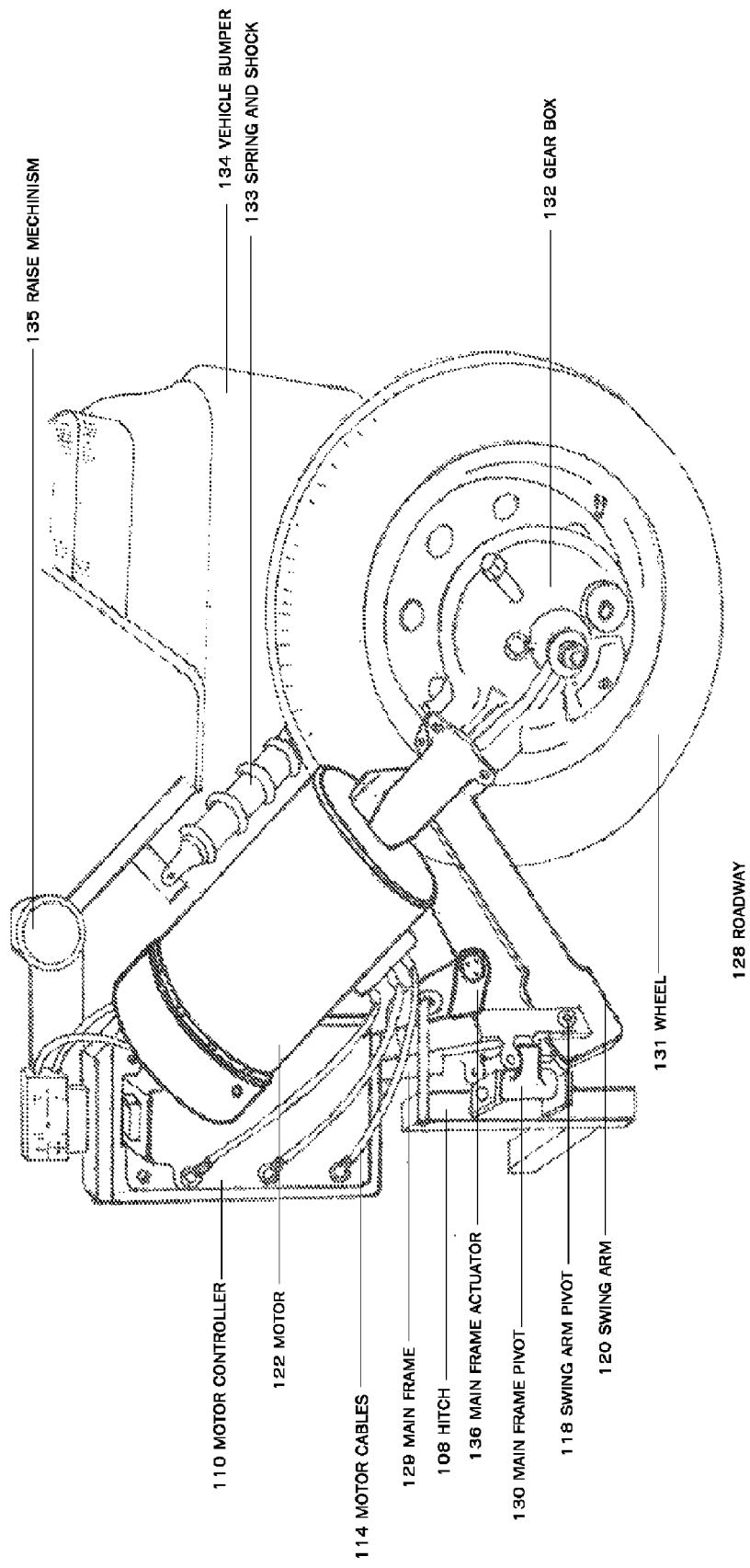
FIG. 2 is a right side elevation of the embodiment of FIG. 1.

FIG. 2 is the right side elevation. An electric motor 122 is operatively connected to the wheel 131. A gear box 132 is operatively connected between the electric motor 122 and the wheel 131. As shown, the motor 122 can be mounted perpendicular to the axis of the wheel 131.

A motor controller 110 is electrically connected to the motor 122, a storage battery, not shown, and a momentum switch that is described later. The motor 122 and controller 110 can be supplied as a unit. A satisfactory example is the Curtis model 1236. The group is preferably 48 volt. Other voltages could be used, including without limitation, 12, 18, 24, and 36 volts. Motor cables 114 electrically connect the motor controller 110 to the electric motor 122.

The battery is preferably 12 volt deep cycle batteries connected in series, although other configurations could be used. For weight distribution, the batteries can be stored on the vehicle, for example, in an automobile trunk, pickup bed, or a carrier rack attached to the back of a vehicle. The battery is preferably secured to the car trunk or truck bed and not on the outboard device proper to improve balance and handling characteristics of the outboard device. The smoother ride of the car trunk or truck bed serves to preserve battery life, since excessive vibration can shorten battery life.

Figure 3:
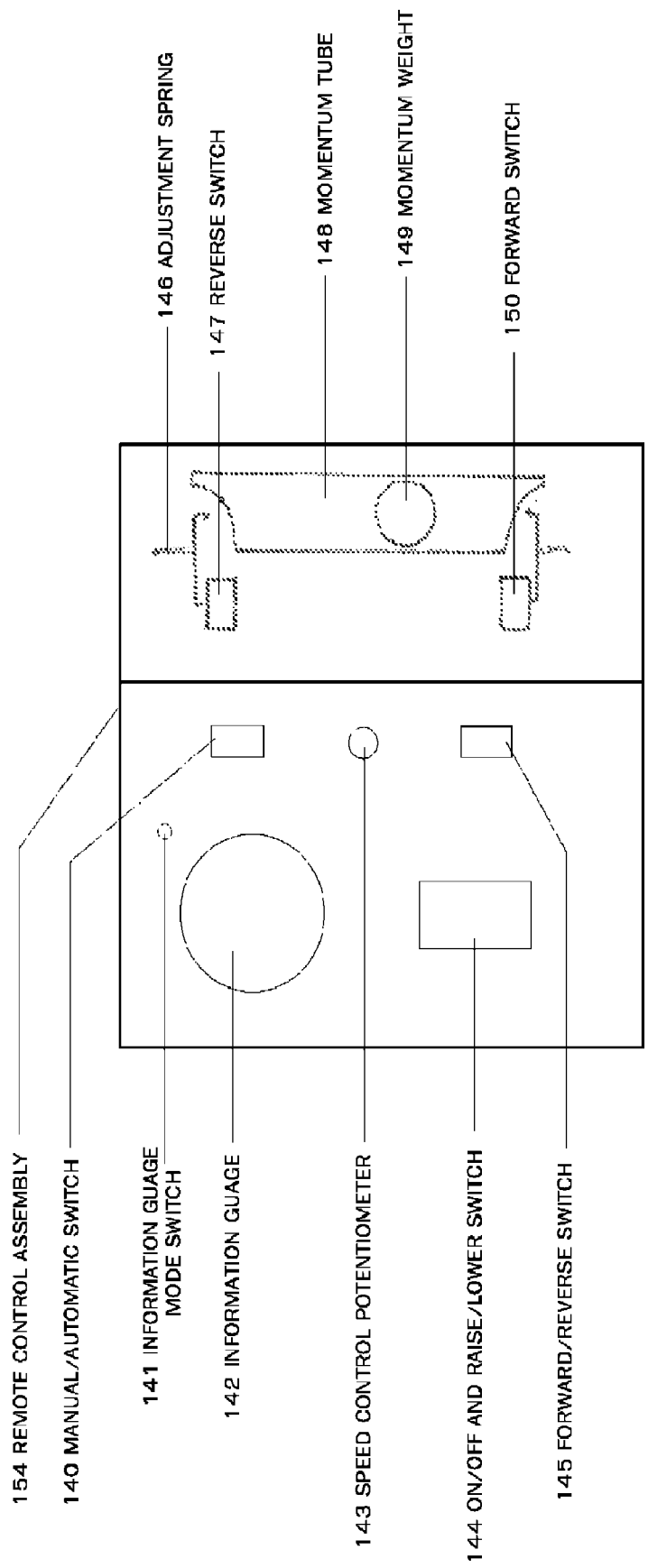
FIG. 3 is a layout of a remote control assembly according to the present invention.

FIG. 3 shows a layout of a remote control assembly 154 that is preferably installed inside the vehicle where an operator can use it. The remote control assembly can house the momentum switch, which is shown rotated 90 degrees counterclockwise from the way it should be operated. The momentum switch comprises a momentum tube 148 having a forward end and a reverse end opposite the forward end; a momentum weight 149, such as a ball, inside the momentum tube 148; a forward switch 150 electrically connected to the motor controller 110, the forward switch being activated by the momentum weight when the momentum weight reaches the momentum tube reverse end; and a reverse switch 147 electrically connected to the motor controller, the reverse switch 147 being activated by the momentum weight when the momentum weight reaches the momentum tube forward end. An adjustment spring 146 is provided in contact with the switches for adjustments.

The vehicle has a front end toward which the vehicle travels when traveling forward, and has a back end toward which the vehicle travels when travelling in reverse. The momentum switch is secured within the vehicle so that the forward switch 150 is aligned toward the back end and the reverse switch 147 is aligned toward the front end.

The remote control assembly 154 can have other controls and gauges. An on/off and raise/lower switch 144 can be electrically connected to the motor controller 110. A forward/reverse switch 145 can also be electrically connected to the motor controller 110. An information gauge 142, information gauge mode switch 141, manual/automatic switch 140, and speed control potentiometer 143 can also be provided with the remote control assembly 154.

Figure 4:
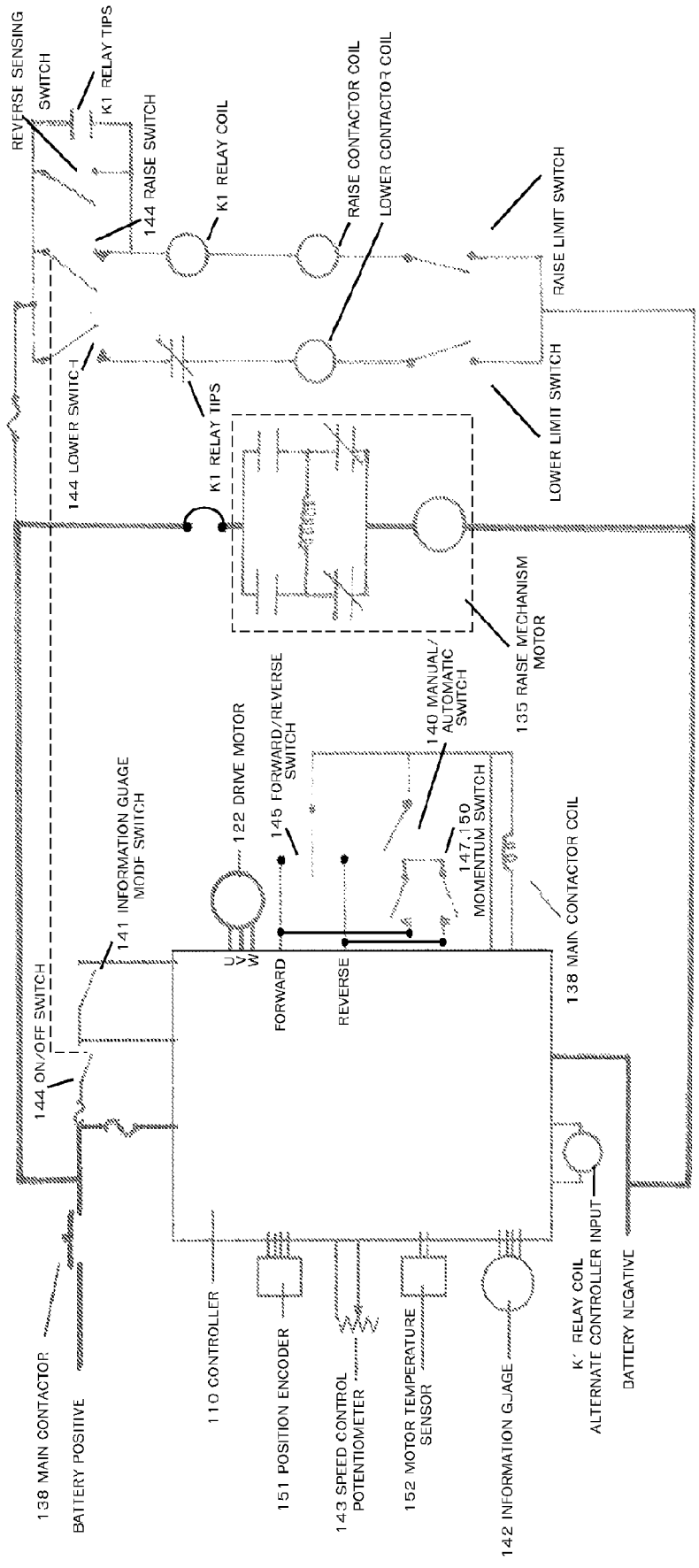
FIG. 4 is an electrical schematic of the present invention.

FIG. 4 is an electrical schematic of the invention, and provides details for the raise/lower system. The raise/lower switch 144 is an additional set of contacts on the on/off switch, as shown connected with phantom lines. In operation, the device lowers when the on/off switch is turned on, and raises when the on/off switch is turned off. The K–1 reversing relay does two things: raises device to full height until the limit switch is actuated, when the on/off switch is turned off, and raises device full height until the limit switch is actuated when the wheel 131 is turned in reverse to prevent jackknifing. It also has a main frame actuator 136 (which is actually a hydraulic door closer). This actuator lightly tucks the device to the side when the wheel is raised to make parking easier. When the device is turned on and lowered the device will overcome the actuator tendency to tuck the device against the rear of the vehicle and will follow the vehicle once again.

Altogether, the components form an outboard electric drive apparatus that converts a conventional vehicle into a hybrid. A version with a manual switch allows the operator to use the device as a plug in hybrid for long straight highway driving. The apparatus can then be deployed and hitched to the rear of a vehicle for city use or use in hilly terrain. A preferred embodiment uses a standard trailer hitch and receiver that permits the apparatus to be moved to any vehicle that has a standard hitch receiver installed. It is a universal apparatus that provides the benefits of the higher fuel economy without buying a new hybrid vehicle.

In operation, when a vehicle accelerates from being stopped, the momentum switch senses that the vehicle is accelerating. A signal is sent to the controller that the vehicle is accelerating, and the controller permits power to flow from the battery to the motor in a direction that provides force from the wheel toward the direction of vehicle travel. It is a hybrid assist.

When the vehicle decelerates, the momentum switch will sense this as well. A signal is sent to the controller that the vehicle is decelerating, and the controller permits the rotation of the motor from the wheel to produce electrical energy that is fed to the battery for recharging. It is estimated that this apparatus could improve fuel economy in city driving by 20% to 25%.

Because of inefficiencies in charging batteries, it may be advisable to include a device that enables electrical charging of the battery while the vehicle is going at a constant speed. Better still would be to include battery charge state indicators that would disengage electrical charging when the battery is at full capacity.

Still other methods of maintaining voltage charge include providing an electrical connection to the alternator of the vehicle, and providing photovoltaic panels electrically coupled to the battery.

Other optional devices and features include dashboard readouts of charging voltage and current, discharging voltage and current, battery state, and manual override controls.

Not all controllers are capable of signaling the raise/lower motor to activate. As an alternate method of signaling the raise/lower motor to raise upon reversal of the wheel would to be use a sensing switch which follows the rim of the drive wheel. A switch is mounted on the swing arm or gearbox with a flexible arm follows the rim and is closed upon reversal when the wheel pulls the flexible arm to a position which actuates the switch.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. An outboard electric drive attachable to a vehicle comprising:
   a hitch attachable to a vehicle;
   a swing arm pivotally connected to the hitch;
   a wheel rotatably secured to the swing arm;
   an electric motor operatively connected to the wheel;
   a momentum switch capable of detecting acceleration and deceleration operatively coupled to the electric motor;
   an electric storage battery operatively connected to the electric motor and momentum switch; and
   a motor controller electrically connected to the electric motor, electric storage battery, and momentum switch such that the wheel applies force in the direction of vehicle travel when the momentum switch senses acceleration and applies force in the direction opposite the direction of vehicle travel when the momentum switch senses deceleration and recharges the battery;
   wherein the momentum switch comprises
      a momentum tube having a forward end and a reverse end opposite the forward end;
      a momentum weight inside the momentum tube;
      a forward switch electrically connected to the motor controller, the forward switch being activated by the momentum weight when the momentum weight reaches the momentum tube reverse end; and
      a reverse switch electrically connected to the motor controller, the reverse switch being activated by the momentum weight when the momentum weight reaches the momentum tube forward end.

2. The outboard electric drive of claim 1, the vehicle comprising a front end toward which the vehicle travels when traveling forward, and having a back end toward which the vehicle travels when travelling in reverse, wherein the momentum switch is secured within the vehicle so that the forward switch is aligned toward the back back end and the reverse switch is aligned toward the front end.

3. The outboard electric drive of claim 1, further comprising a remote control assembly, the remote control assembly comprising:
   the momentum switch; and
   an on/off and raise/lower switch electrically connected to the motor controller for manually raising the wheel.

4. The outboard electric drive of claim 3, the remote control assembly further comprising a forward/reverse switch electrically connected to the motor controller for manually selecting wheel forward or reverse drive.

5. The outboard electric drive of claim 3, the remote control assembly further comprising:
   an information gauge mode switch;
   an information gauge; and
   a speed control potentiometer.

6. An outboard electric drive attachable to a vehicle comprising:
   a hitch attachable to a vehicle;
   a swing arm pivotally connected to the hitch;
   a wheel rotatably secured to the swing arm;
   an electric motor operatively connected to the wheel;
   a momentum switch capable of detecting acceleration and deceleration operatively coupled to the electric motor;
   an electric storage battery operatively connected to the electric motor and momentum switch;
   a motor controller electrically connected to the electric motor, electric storage battery, and momentum switch such that the wheel applies force in the direction of vehicle travel when the momentum switch senses acceleration and applies force in the direction opposite the direction of vehicle travel when the momentum switch senses deceleration and recharges the battery;
   a main frame between the hitch and the swing arm, the main frame being pivotally connected to the hitch by a main frame pivot, and the main frame being pivotally connected to the swing arm;
   a reversing relay secured to the main frame and electrically connected to the remote control assembly;
   a raise/lower contactor secured to the main frame and electrically connected to the remote control assembly;
   a main power contactor secured to the main frame and electrically connected to the remote control assembly; and
   a battery connector secured to the main frame and electrically connected to the electric storage battery.

7. The outboard electric drive of claim 6 further comprising:
   a raise mechanism secured to the main frame; and
   a spring and shock having a first end secured to the raise mechanism and a second end opposite the first end secured to the swing arm.

8. The outboard electric drive of claim 6 further comprising a reverse sensing switch operatively connected to the wheel wired to automatically raise the wheel when the reverse sensing switch senses the wheel is operating in reverse.

9. An outboard electric drive attachable to a vehicle comprising:
   a hitch attachable to a vehicle;
   a swing arm pivotally connected to the hitch;
   a wheel rotatably secured to the swing arm;
   an electric motor operatively connected to the wheel;
   a momentum switch capable of detecting acceleration and deceleration operatively coupled to the electric motor;
   an electric storage battery operatively connected to the electric motor and momentum switch;
   a motor controller electrically connected to the electric motor, electric storage battery, and momentum switch such that the wheel applies force in the direction of vehicle travel when the momentum switch senses acceleration and applies force in the direction opposite the direction of vehicle travel when the momentum switch senses deceleration and recharges the battery;
   a main frame between the hitch and the swing arm, the main frame being pivotally connected to the hitch by a main frame pivot, and the main frame being pivotally connected to the swing arm; and
   a main frame actuator arm secured to the main frame.

10. The outboard electric drive of claim 1 further comprising a gear box operatively connected between the electric motor and the wheel.

11. The outboard electric drive of claim 10 wherein the electric motor is secured perpendicular to an axis of the wheel.

12. The outboard electric drive of claim 1 further comprising a position encoder electrically connected to the motor controller.

13. The outboard electric drive of claim 1 further comprising a motor temperature sensor electrically connected to the motor controller and electric motor.

14. The outboard electric drive of claim 1, wherein the electric storage battery is secured to the vehicle.

15. The outboard electric drive of claim 1, wherein the electric motor is a 48 volt AC motor.

* * * * *